US011853862B2

(12) United States Patent
Thorpe et al.

(10) Patent No.: US 11,853,862 B2
(45) Date of Patent: Dec. 26, 2023

(54) METHOD, DIGITAL ELECTRONIC CIRCUIT AND SYSTEM FOR UNSUPERVISED DETECTION OF REPEATING PATTERNS IN A SERIES OF EVENTS

(71) Applicant: BrainChip, Inc., Laguna Hills, CA (US)

(72) Inventors: Simon Thorpe, Saint Felix Lauragais (FR); Timothée Masquelier, Toulouse (FR); Jacob Martin, Toulouse (FR); Amir Reza Yousefzadeh, Seville (ES); Bernabe Linares-Barranco, Seville (ES)

(73) Assignee: BrainChip, Inc., Laguna Hills, CA (US)

( * ) Notice: Subject to any disclaimer, the term of this patent is extended or adjusted under 35 U.S.C. 154(b) by 955 days.

(21) Appl. No.: 16/349,248

(22) PCT Filed: Nov. 20, 2017

(86) PCT No.: PCT/EP2017/079767
§ 371 (c)(1),
(2) Date: May 10, 2019

(87) PCT Pub. No.: WO2018/091706
PCT Pub. Date: May 24, 2018

(65) Prior Publication Data
US 2019/0286944 A1    Sep. 19, 2019

(30) Foreign Application Priority Data

Nov. 21, 2016  (EP) ..................................... 16306525
Feb. 20, 2017  (EP) ..................................... 17305186

(51) Int. Cl.
*G06N 3/049*    (2023.01)
*G06N 3/063*    (2023.01)
(Continued)

(52) U.S. Cl.
CPC ......... *G06N 3/049* (2013.01); *G06F 18/2148* (2023.01); *G06F 18/2178* (2023.01);
(Continued)

(58) Field of Classification Search
CPC ........ G06N 3/049; G06N 3/063; G06N 3/088; G06K 9/6257; G06K 9/6201;
(Continued)

(56) References Cited

U.S. PATENT DOCUMENTS 9,047,568 B1 *  6/2015  Fisher .................... G06N 3/049
9,195,934 B1    11/2015  Hunt et al.
(Continued)

FOREIGN PATENT DOCUMENTS

WO    2012/054109 A1    4/2012
WO    2013/119867 A1    8/2013

OTHER PUBLICATIONS

Yousefzadeh, et al., "Hardware implementation of convolutional STDP for on-line visual feature learning", 2017 IEEE International Symposium on Circuits and Systems (ISCAS), May 28, 2017.
Misra, et al., "Artificial neural networks in hardware: A survey of two decades of progress", Neurocomputing, vol. 74, Issues 1-3, pp. 239-255, May 5, 2010.
(Continued)

Primary Examiner — Ryan C Vaughn
(74) Attorney, Agent, or Firm — Sterne, Kessler, Goldstein & Fox P.L.L.C.

(57) ABSTRACT

A method of performing unsupervised detection of repeating patterns in a series (TS) of events (E21, E12, E5, . . . ), comprising the steps of: a) Providing a plurality of neurons (NR1-NRP), each neuron being representative of W event types; b) Acquiring an input packet (IV) comprising N successive events of the series; c) Attributing to at least some neurons a potential value (PT1-PTP), representative of the number of common events between the input packet and the neuron; d) Modifying the event types of neurons having a potential value exceeding a first threshold $T_L$; and e) Gen-
(Continued)

erating a first output signal (OS1-OSP) for all neurons having a potential value exceeding a second threshold $T_F$, and a second output signal, different from the first one, for all other neurons. A digital electronic circuit and system configured for carrying out the above method.

20 Claims, 9 Drawing Sheets

(51) Int. Cl.
    *G06N 3/088*     (2023.01)
    *G06F 18/22*     (2023.01)
    *G06V 20/40*     (2022.01)
    *G06F 18/214*     (2023.01)
    *G06F 18/21*     (2023.01)

(52) U.S. Cl.
    CPC .............. *G06F 18/22* (2023.01); *G06N 3/063* (2013.01); *G06N 3/088* (2013.01); *G06V 20/41* (2022.01); *G06V 20/44* (2022.01)

(58) Field of Classification Search
    CPC ...... G06K 9/6263; G06V 20/41; G06V 20/44; G06F 18/2178; G06F 18/22; G06F 18/2148
    See application file for complete search history.

(56) References Cited

U.S. PATENT DOCUMENTS

| | | | |
|---|---|---|---|
| 10,489,700 B1* | 11/2019 | Asnaashari | G11C 13/0069 |
| 2013/0117209 A1* | 5/2013 | Aparin | G06N 3/063 706/25 |
| 2014/0143193 A1 | 5/2014 | Zheng et al. | |
| 2015/0302295 A1 | 10/2015 | Rivera et al. | |
| 2016/0086076 A1 | 3/2016 | Alvarez-Icaza Rivera et al. | |
| 2016/0358069 A1 | 12/2016 | Brothers et al. | |

OTHER PUBLICATIONS

Querlioz, et al., "Bioinspired networks with nanoscale memristive devices that combine the unsupervised and supervised learning approaches", 2012 IEEE/ACM International Symposium on Nanoscale Architectures (NANOARCH), pp. 203-210, Jul. 4, 2012.

Masquelier, et al., "Spike timing dependent plasticity finds the start of repeating patterns in continuous spike trains", PLOS One 3, e1377 (2008).

Gilson, et al., "STDP Allows Fast Rate-Modulated Coding with Poisson-Like Spike Trains", PLoS Comput., Biol. 7, e1002231, (2011).

Masquelier, et al., "Competitive STDP-Based Spike Pattern Learning", Neural Comput 21, pp. 1259-1276, (2009).

Moen, "Attribute, Event Sequence, and Event Type Similarity Notions for Data Mining", Thesis for PhD in Computer Science at the University of Helsinki, Feb. 2000.

Thorpe, et al., "Unsupervised learning of repeating patterns using a novel STDP based algorithm", Abstracts of the 17th annual meeting of the Vision Sciences Society (VSS'17), May 19-24, 2017.

Domeniconi, et al., "A Classification Approach for Prediction of Target Events in Temporal Sequences", Lecture Notes in Computer Science, vol. 2431, pp. 125-137, Aug. 19, 2002.

Office Action dated Oct. 15, 2021 for U.S. Appl. No. 16/417,218, filed May 20, 2019, 18 pages.

Kim et al., "Random Noise Effects in Pulse-Mode Digital Multilayer Neural Networks," in vol. 6, No. 1, IEEE Trans on Neural Networks 220-29 (1995), 10 pages.

Buduma, Deep Learning in a Nutshell—What it Is, How it Works, Why Care?, screenshot captured Dec. 31, 2015, http://web.archive.org/web/20151231064707/https://www.kdnuggets.com/2015/01/deep-learning-explanation-what-how-why.html. (2015), 11 pages.

Srivastava et al., "Dropout: A Simple Way to Prevent Neural Networks from Overfitting," in 15 J. Machine Learning Res. 1929 (2015), 30 pages.

Davies et al., "Population-Based Routing in the SpiNNaker Neuromorphic Architecture," in Int'l Joint Conf. Neural Networks 1-8 ( 2012), 8 pages.

* cited by examiner

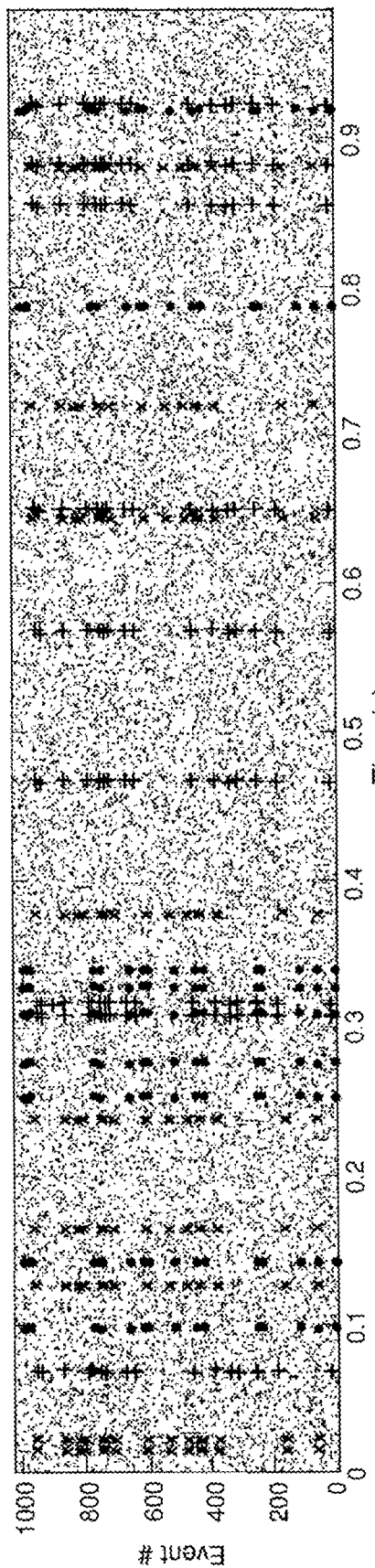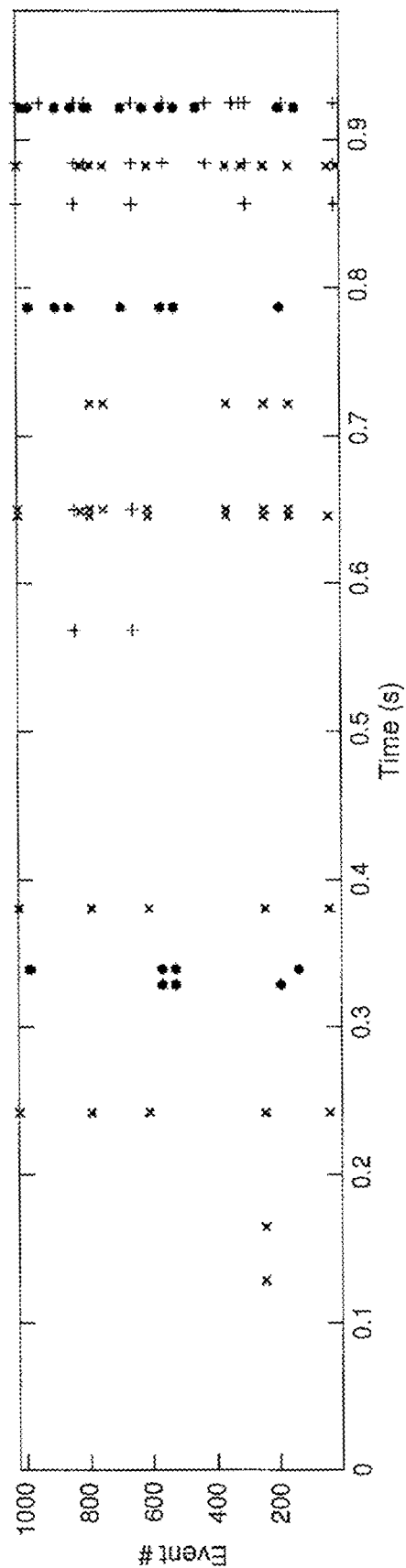
FIG.2A
FIG.2B

METHOD, DIGITAL ELECTRONIC CIRCUIT AND SYSTEM FOR UNSUPERVISED DETECTION OF REPEATING PATTERNS IN A SERIES OF EVENTS

CROSS-REFERENCE TO RELATED APPLICATIONS

This application is a national phase of PCT Application No. PCT/EP2017/079767 filed on Nov. 20, 2017, which in turn claims priority to European Application No. EP17305186.3 filed Feb. 20, 2017 and European Application No. EP16306525.3 filed Nov. 21, 2016, all of which are incorporated herein by reference in their entirety.

DESCRIPTION

Object of the Invention

The invention relates to a method, a digital circuit, a system and a computer program product for performing unsupervised detection of repeating patterns in a series of events. It belongs to the technical fields of digital electronics and of machine learning and more particularly to the subfield of neural networks. It lends itself to several applications including—but not limited to—video stream processing (e.g. Dynamic Vision Sensors) and audio processing (e.g. artificial *cochleae*).

Prior Art

One of the most striking features of the cerebral cortex is its ability to wire itself in order to adapt to its environment. Sensory substitution or addition experiments suggest that neurons can make sense of any kind of sensory data, presumably using the same basic mechanisms. One such mechanism is supposed to be the so called spike-timing-dependent plasticity (STDP). It has been shown that artificial neurons equipped with this mechanism can detect repeating patterns of input "spikes", in an unsupervised manner, even when those patterns are embedded in noise. See e.g.:

Masquelier, T., Guyonneau, R. & Thorpe, S. J. Spike timing dependent plasticity finds the start of repeating patterns in continuous spike trains. PLoS One 3, e1377 (2008).

Masquelier, T., Guyonneau, R. & Thorpe, S. J. Competitive STDP-Based Spike Pattern Learning. Neural Comput 21, 1259-1276 (2009).

Gilson, M., Masquelier, T. & Hugues, E. STDP allows fast rate-modulated coding with Poisson-like spike trains. PLoS Comput. Bioi. 7, e1002231 (2011).

This amazing ability has inspired a number of neuromorphic algorithms and architectures, used for data processing and more particularly for temporal pattern recognition.

For instance WO 2012/054109 discloses an artificial neural network having a plurality of synapses, each synapse having an adjustable weight which takes discrete values and changes in discrete steps with a probability depending on a time elapsed between a pair of spikes originating from a post-synaptic neuron circuit and a pre-synaptic neuron circuit connected to it. Operating such an artificial neural network is computationally intensive, as updating the synapse weights (essential for learning) requires multiply-accumulate operations, and multiplications are known to be the most space and power-hungry operations in the digital implementation of artificial neural networks.

WO2013119867 discloses an artificial neural network wherein synapses do not have weights—or, equivalently, have binary weights: a synapse is then either existing or non-existing. Despite this simplification, operating this artificial neural network remains computationally intensive, as it requires measuring and applying variable delays to input and output spikes.

Moreover, artificial neural networks according to the prior art generally suffer from a lack of robustness: they may fail to detect a pattern it if is slightly distorted, or if the event acquisition rate varies.

More particularly, in current STDP-based approaches, fine-tuning of the numerous parameters of the rule is required. This also adversely affects robustness. For instance, the ratio between weight reinforcement and weight depression is crucial: if too large, most weights end up saturated, leading to very active but non-selective neurons. If too low, the weights tend to decrease until the neurons do not reach their threshold anymore, which is a dead end.

The PhD thesis of Pirjo Moen "Attribute, Event Sequence, and Event Type Similarity Notions for Data Mining", University of Helsinki, February 2000, discloses several metrics for the similarity between event sequences. These metrics are intended for application to data mining.

The invention is aimed at overcoming these drawbacks of the prior art by providing a method and an architecture for performing unsupervised detection of temporal patterns which is simple and economical to implement (in terms of computing time, energy consumption and/or silicon surface), effective and robust.

According to some embodiments of the invention, these aims are achieved thanks to the following technical features:

- Input events ("spikes") are grouped into fixed-size packets. The temporal order between events of a same packet is lost, which may seem a drawback, but indeed increases robustness as it eases the detection of distorted patterns and makes the method insensitive to changes of the event rate.
- Weighted or un-weighted synapses are replaced by a set of binary weights. Learning only requires flipping some of these binary weights and performing sums and comparisons, thus minimizing the computational burden.
- The number of binary weights which is set to "1" for each neuron does not vary during the learning process. This avoids ending up with non-selective or non-sensible neurons.

Like other neuromorphic architectures, spiking neural networks are most often implemented by software running on general or specialized (e.g. graphical processing units, GPU) processors. In some cases, hardware implementations—based e.g. on FPGA (Field Programmable Gate Array) or other programmable circuits, or even on ASICs (Application Specific Integrated Circuit)—are used to improve performance. These hardware implementations, however, are often complex, requiring a large silicon surface, and are therefore expensive. In some cases, analog or mixed-signal implementations using special devices such as memristors are used, but this approach is also complex and expensive.

According to an aspect of the invention, these drawbacks of the prior art are overcome by providing a digital hardware implementation of a spiking network which is simple and economical in terms of computing time, energy consumption and/or silicon surface, while being very effective at performing robust unsupervised detection of repeating patterns.

DESCRIPTION OF THE INVENTION

An object of the present invention is a method of performing unsupervised detection of repeating patterns in a series of events, each event of the series belonging to an event type of an M-element set of event types, the method comprising the steps of:
a) Providing a plurality of neurons, each neuron being representative of a W-element subset of the set of event types, with $1 \leq W \leq M$;
b) Acquiring an input packet comprising N successive events of the series, with $1 \leq N \leq M$ and preferably $1 < N < M$;
c) Attributing to at least some neurons a potential value, representative of the number of events of the input packet whose types belong to the W-element subset of the neuron;
d) for neurons having a potential value exceeding a first threshold TL, replacing $n_{swap} \geq 1$ event types of the corresponding W-element subset, which are not common to the input packet, with event types present in the input packet and not currently belonging to said W-element subset; and
e) generating an output signal indicative of neurons having a potential value exceeding a second threshold TF, greater than the first threshold;
steps b) to e) being repeated a plurality of times.

In a preferred embodiment, $n_{swap}$ and TL are set independently for different neurons. More preferred, $n_{swap}$ and TL are respectively decreased and increased as the potential value of the neuron increases.

According to further embodiments of the method, each neuron is implemented by a Boolean vector having M components, each component being associated with a different event type of said set, W of said components taking a first Boolean value and (M-W) of said components taking a second Boolean value.

Preferably, step a) comprises performing random initialization of the neurons.

More preferably, step b) comprises filling a M-element Boolean vector, called an input vector, each element of which is associated with a different event type of said set, by setting at the first Boolean value element associated with event types present in the input packet, and at the second Boolean value elements associated with event types not present in the input packet.

Even more preferably, step c) comprises comparing (CMP) element-wise the input vector and the vectors implementing neurons.

Optionally, the method further comprises a step f) of generating a series of events from the output signals generated at step e), and repeating steps a) to e) by taking said series as input.

Another object of the invention is a digital (preferably integrated) electronic circuit configured for carrying out such a method, said digital electronic circuit comprising:
an input unit, configured for receiving, on an input port of the digital electronic circuit, a series of digital signals representing respective events, each signal of the series belonging to a signal type of an M-element set of signal types, and for generating a data packet representative of N contiguous signals of the series, with $1 \leq N \leq M$ and preferably $1 < N < M$;
a memory storing data defining a plurality of neurons, the data defining each one of said neurons comprising a set of binary weights representative of a subset of the set of signal types;
a match calculating unit, connected to said input unit and said memory, configured for receiving a data packet from the input unit; for computing, for at least some of the neurons defined by the data stored in the memory, a potential value representative of the number of signals of the input packet whose types belong to the subset of the neuron; and for generating, on an output port of the digital electronic circuit, a series of output signals indicative of neurons having a potential value exceeding a threshold $T_F$, called a firing threshold; and
a learning unit, connected to said input unit, said match calculating unit and said memory, configured for modifying, inside said memory, the set of binary weights of neurons having a potential value exceeding a threshold TL, called a learning threshold, said modifying comprising swapping $n_{swap} \geq 1$ binary weights representative of signal types of the subset of the set of signal types which are not present in the input packet, with a same number of binary weights representative of signal types that are present in the input packet and not currently belonging to said subset of the set of signal types.

Another subject of the invention is a digital electronic system comprising:
a plurality of such digital electronic circuits, at least two of which comprise input units having filters configured to allow incoming digital signals having different values of an indicator of a neuron population contained within each digital signal of said series, wherein the matching units of said digital electronic circuit are configured for generating a said output signal also containing an updated indicator of a neuron population; and
a signal merger having a plurality of input ports and a single output port, the input ports of the signal merger being connected to the output ports of said digital electronic circuits and the output port of the signal merger being connected to the input ports of said digital electronic circuits and to an output port of the digital electronic system.

Yet another object of the invention is a computer program product, stored on a non-volatile computer-readable data-storage medium, comprising computer-executable instructions to cause a computer to carry out such a method.

BRIEF DESCRIPTION OF THE DRAWINGS

Additional features and advantages of the present invention will become apparent from the subsequent description, taken in conjunction with the accompanying drawings, which show:

FIGS. 2A, 2B and 3, plots illustrating the technical results of the invention;

EMBODIMENTS OF THE INVENTION

The inventive method allows analyzing a series of "events". In actual digital implementations, an event may typically be expressed by a fixed-length binary word. For instance, if 10-bit words are used, there will be $2^{10}=1024$ different event types. Each event type may represent e.g., the luminance values of a set of pixels of an image detector, a sound in an audio stream, etc. Let $\{E1, \ldots, EM\}$ be the M-element set of allowable event types, and TS be a list of successive events, each event of TS belonging to an event type of the set. For the sake of simplicity, each event of TS will be identified by its event type. Therefore, it will be possible to write e.g. TS=(E21, E12, E5, ...).

The list TS does not need to have timestamps, but it needs to be ordered. It is possible that some events are in fact simultaneous or quasi-simultaneous, in which case their order in the list is partially arbitrary.

A "pattern" is constituted by a group of nearby events that occur repeatedly within the series TS, even if different repetitions slightly differ, e.g.

due to noise (some events can be missing, or additional events can be interleaved). The inventive method aims at detecting such patterns, otherwise stated as generating a distinguishable output signal when a pattern occurs. The detection is performed by unsupervised learning, i.e. it is not required to enter a list of the pattern to be detected: after some presentations, the algorithm learns alone to recognize repeating patterns within the input series TS.

Figure 1:
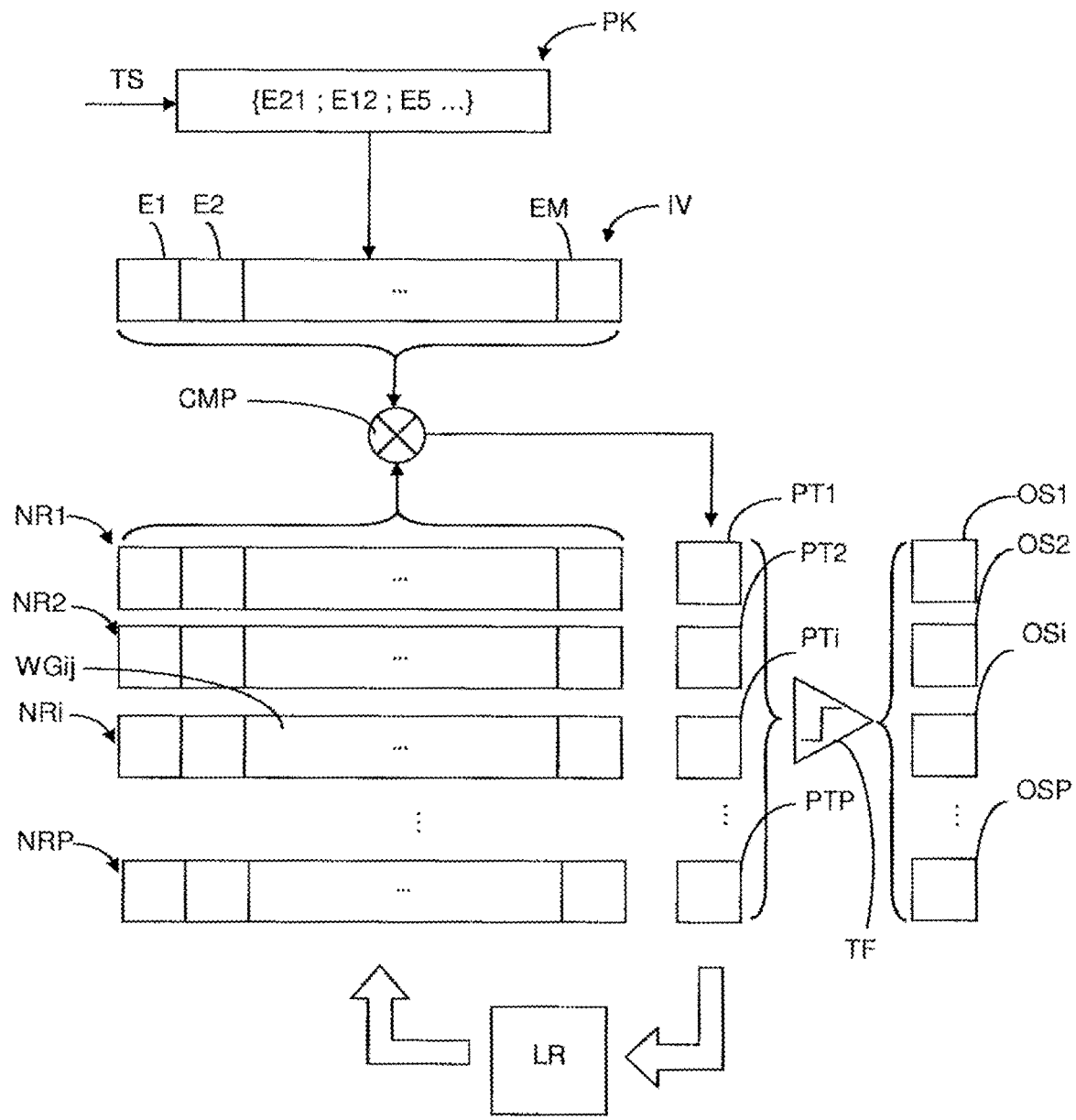
FIG. 1, a block diagram of an implementation of the inventive method.

As illustrated in FIG. 1, the series TS is read sequentially, until a predetermined number N (usually greater than 1) of events has been acquired, forming a "packet" PK. The series can then be seen as a succession of packets.

In an advantageous embodiment of the invention, the acquired packet is used to fill a M-element Boolean vector, or array, called input vector IV, each element of which is associated with an event type: $E1, E2, \ldots, EM$. Initially, all the elements of the input vector IV are set to "0"; whenever an element "Ei" is acquired, the corresponding element of the input vector takes the value "1". At the end of the acquisition of a packet, the input vector IV will therefore contain N "ones" and M-N "zeros". The following Table 1 shows an example of an input vector for the case M=20, N=4, PK=\{E3, E5, E10, E12\}:

It is interesting to note that the input vector does not keep track of the order of the events within the packet. As explained above, this is an important feature of the invention, and does contribute to its robustness.

It will be understood that the size N of a packet PK has to be smaller—and preferably much smaller, i.e. by at least a factor of 10—than the number M of event types (albeit this is not the case for the example of table 1, which is only provided as an illustration). Indeed, the inventive method does not allow taking into account the presence of several events of a same type within a same packet; therefore such a situation should be exceptional.

The detection of patterns is performed using a set of P "neurons", each associated with a set of W unique event types, i.e. with a subset of the M-element set of all possible event types. Typically, W is greater than 1 and smaller than the number N of events in a packet as well as the number M of event types; the number P of neurons may advantageously be equal to M, for reasons which will be explained further, but this is by no means essential.

According to an advantageous embodiment of the invention, each neuron NR1, NR2, ... NRi, ..., NRP is represented by a M-element Boolean vector, or array, each element WGij of which is associated with an event type Ej; this is analogous to the representation of an event packet by the input vector. Neurons are initialized by randomly setting W of their elements to "1", while the remaining (M-W) elements are at "0". Elements of the neuron vector having a value of "1" are also called "weights".

Whenever an event packet PK is acquired, it is compared (reference CMP on FIG. 1) to any one of the P neurons. Advantageously, the comparison consists in performing a logical AND between corresponding elements of the input vector and of each neuron. This allows identifying events of the input packet corresponding to the event types of each neuron ("matches"). The number of matches for a neuron determines its "potential" PT1, PT2, ..., PTi, ..., PTP. Table 2 illustrates an example, based on the input vector of table 1, where W=4. Matches are indicated in bold characters, and the potential values are underlined.

TABLE 1

| E1 | E2 | E3 | E4 | E5 | E6 | E7 | E8 | E9 | E10 | E11 | E12 | E13 | E14 | E15 | E16 | E17 | E18 | E19 | E20 |
|----|----|----|----|----|----|----|----|----|-----|-----|-----|-----|-----|-----|-----|-----|-----|-----|-----|
| 0  | 0  | 1  | 0  | 1  | 0  | 0  | 0  | 0  | 1   | 0   | 1   | 0   | 0   | 0   | 0   | 0   | 0   | 0   | 0   |

TABLE 2

| | Event type | | | | | | | | | | | | | | | | | | | | |
|---|---|---|---|---|---|---|---|---|---|---|---|---|---|---|---|---|---|---|---|---|---|
| | E1 | E2 | E3 | E4 | E5 | E6 | E7 | E8 | E9 | E10 | E11 | E12 | E13 | E14 | E15 | E16 | E17 | E18 | E19 | E20 | Potential |
| IV | 0 | 0 | 1 | 0 | 1 | 0 | 0 | 0 | 0 | 1 | 0 | 1 | 0 | 0 | 0 | 0 | 0 | 0 | 0 | 0 | |
| NR1 | 0 | 1 | 1 | 0 | 0 | 0 | 1 | 0 | 0 | 0 | 0 | 0 | 0 | 0 | 0 | 1 | 0 | 0 | 0 | 0 | 1 |
| NR2 | 1 | 0 | 1 | 0 | 1 | 0 | 0 | 0 | 0 | 0 | 0 | 1 | 0 | 0 | 0 | 1 | 0 | 0 | 0 | 0 | 3 |
| NRP | 0 | 0 | 0 | 1 | 0 | 1 | 0 | 1 | 0 | 0 | 1 | 1 | 0 | 0 | 0 | 1 | 0 | 0 | 0 | 0 | 0 |

In the exemplary embodiment discussed here, a potential value is attributed to each one of the neurons, but this is not necessarily the case. The potential is not necessarily equal to the number of matches, as in this exemplary embodiment. More generally, it may be any value representative of this number, e.g. a suitable, preferably monotone, function thereof.

If all the events occur independently and with the same probability, then the potential has a hypergeometric distribution with N draws from a population of size M containing W successes (or, equivalently, W draws from a population of size M containing N successes). If N<<M (which is possible for applications where M is large), then the probability of the potential being greater or equal than a threshold T quickly drops with T. For example with M=1024, N=64 and W=32, then the probability Pr of the potential being greater or equal than 9 is $10^{-5}$ approximately. That being said, for most real applications input events will not occur independently, and their frequencies may also differ.

All the neurons whose potential is greater or equal than a first, or "learning", threshold TLi (index "i", which will be omitted when this does not cause confusion, is used because the threshold may be—and preferably is—different for each neuron) are modified according to a learning rule (functional bloc LR on FIG. 1). The idea is that only neurons which are already sufficiently similar to the input packet should be trained in order to recognize it.

The training is performed by swapping a certain number $n_{swap}$ of—randomly chosen—unused weights of the neurons (i.e. "ones" of the neuron vector which do not coincide with "ones" of the input vectors) with—also randomly chosen— active but unused inputs (i.e. "zeros" of the neuron vector which coincide with "ones" of the input vector). In other words, $n_{swap}$ event types of the neuron vector, which are not present in the event types of the input packet, are exchanged with event types present in the input packet and not currently belonging to the neuron. For example, taking $n_{swap}$=1, the weight of the position #1 of neuron NR2, which is unused, is moved to position #10 of the same neuron, which corresponds to an active but unused input.

Table 3 shows the vector of the second neuron NR2 after the swapping.

TABLE 3

| NR2 | 0 | 0 | 1 | 0 | 1 | 0 | 0 | 0 | 0 | <u>1</u> | 0 | 1 | 0 | 0 | 0 | 1 | 0 | 0 | 0 | 0 |
|---|---|---|---|---|---|---|---|---|---|---|---|---|---|---|---|---|---|---|---|---|

It is clear that this makes the neuron's weights more similar to the current input packet. Hence if the same packet arrives again, the potential of neuron NR2 will reach 4. This rule is similar to the biological learning rule known as spike-timing-dependent plasticity (STDP), which reinforces the connections with afferents that contributed to triggering a postsynaptic spike. Yet with STDP the weight modification is subtle but concerns all contributing afferents, while with the inventive rule the weight modification is drastic (i.e. from 0 to 1), but concerns only $n_{swap}$ afferents. Importantly, with the inventive swapping rule, the number of non-zero weights is kept constant for each neuron.

When the potential of a neuron reaches or exceeds a second, or "firing", threshold TF, the neuron emits an output signal (it "fires"). According to an advantageous implementation of the invention, each neuron has a binary output OS1, OS2, . . . OSi, . . . , OSP which normally takes a "0" value, and which commutes to "1" when the threshold TF is reached. Advantageously, the second ("firing") threshold TF is the same for all the neurons and is at least equal to the highest possible value for the first ("learning") threshold TL. The output signal may take any alternative format, provided that it allows identifying the neurons which have fired.

Figure 3:
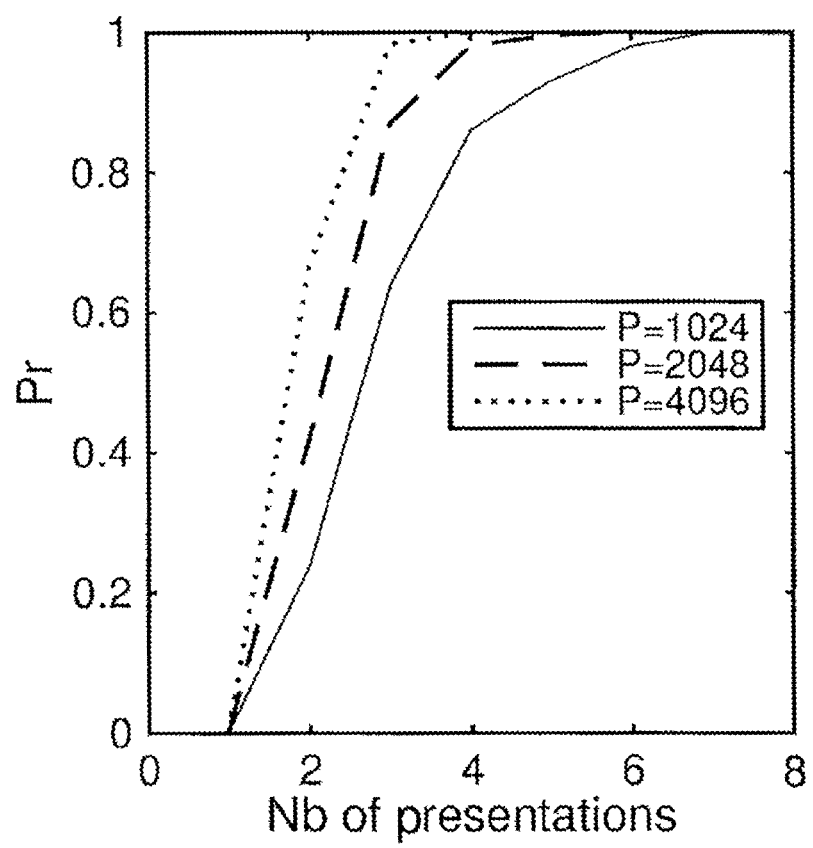

As it will be demonstrated further, with reference to FIGS. 2A, 2B and 3, thanks to this learning rule some neurons will gradually become "selective" to any repeating input pattern. In other words, they will reach their second thresholds and fire when their "preferred" pattern appears, but hardly ever otherwise.

It has been found that it is useful to vary both the learning rate $n_{swap}$, and the first threshold TL independently for each neuron. When learning begins, a relatively low threshold is necessary to start moving the weights. On the same grounds, one wants to move many weights, in order to rapidly forget the arbitrary random initial weights, and rapidly shape them according to the input. As learning progresses, the potentials caused by the repeating patterns tend to increase. This means one can safely increase TL up to a maximum value $T_{max}$ without missing the patterns, yet decreasing the false alarm rate. At this point it is also useful to decrease the learning rate, in order to secure the learned patterns. The learning speed $n_{swap}$ can decrease until $n_{min}$=0 to completely stop learning, or until $n_{min}$=1 if one still wants to slowly adapt to the possibly changing input patterns.

According to a particular embodiment of the invention, the following heuristic rule is proposed to decrease $n_{swap}$ and increase TLi:

TLi is initialized at a same value $T_{min}$ for all "i", and then, whenever the i-th neuron NRi reaches its learning threshold TLi:

TLi:=min($T_{max}$, PTi)
$n_{swap}$:=max($n_{min}$, $n_{swap}$−$dn_{swap}$*(PTi−TLi))

where PTi is the potential of NRi and dnswap is a parameter which tunes the decrease speed (e.g. ¼ W).

Advantageously, the second (firing) threshold is taken equal to the maximal value taken by the learning threshold: $T_F = T_{max}$.

Interestingly, the outputs of the firing neurons also form a series of events, just like TS. More precisely, the firing of each one of the P neurons will constitute an event, and there will be P possible event types. Some of these events may happen simultaneously, if several neurons, trained to detect a same pattern, fire at the same time. This means that it is possible to stack multiple neuron layers using exactly the same algorithm; this is particularly easy if P=M. Neurons in higher layers will learn "meta-patterns", that is combinations of patterns. Besides, it is worth mentioning that neurons typically fire much less frequently than their inputs. This means that packets in higher layers will need more time to be filled, which corresponds to longer integration times.

The inventive method has been tested on synthetic data. Events have been generated randomly using independent Poisson processes (gray dots on FIG. 2A). On top of this activity, three repeating patterns have been introduced ("+", "x" and black dots on the same figure). The patterns consist of 16 nearly simultaneous events of different kinds. They repeat at irregular intervals.

The parameters used for this simulation were:
M=1024
N=64
W=32
Tmin=7
Tmax=$T_F$=9
nswap=32,
nmin=1
dnswap=8
P=1024
f=20 Hz (mean frequency of the inhomogeneous Poisson processes).

FIG. 2B shows the output events, generated by neurons when their potential reaches TF. Neurons tend to be active if and only if some patterns repeat (that is, the random gray input spikes generate virtually no output activity). The most selective neurons for each pattern are those with the maximum number of "good weights" (i.e. corresponding to the pattern's 16 events), among the neurons that have reached the final threshold $T_{max}$. These are very stable neurons which will not forget what they have learned easily. Learning only takes a few presentations (~5). After learning most patterns are detected, and false alarms are very rare.

The firing threshold TF is equal to 9. According to the hypergeometric law, the probability of false alarm per packet is thus ~$7.10^{-5}$, that is one every ~42 seconds. It is worth mentioning that if the task is to detect larger patterns (e.g. 32 events instead of 16), then one can use larger thresholds, leading to much lower false alarm probabilities, e.g. TF=18 leads to one false alarm every 20 000 years. It is an advantageous feature of the invention that the false alarm probability for a given value of the firing threshold can be analytically computed.

In another simulation, a single pattern was used, and the number of its presentations during 1 second of input was varied. The probability Pr of having at least one selective neuron was computed as a function of the number of presentations and for three different values of the number of neurons, P (1024, 2048 and 4096). A selective neuron is defined as having at least 8 good weights (chance level=0.5), and having reached the final threshold $T_{max}$ at t=1s. FIG. 3 shows the results. Learning is very fast: with 1024 neurons, 7 presentations are needed to reach a probability of 1, but with 4096 neurons, 4 presentations are enough.

The inventive method has been described with respect to a specific embodiment, but it is not limited to it. For instance, different implementations could be used for the input vector and for neurons.

The inventive method may be carried out using a suitably programmed computer, possibly including a graphic processing unit (GPU) to speed up execution. A computer program comprising computer-executable instructions to cause a computer system to carry out the inventive method may be stored on a non-volatile computer-readable data-storage medium, e.g. a flash memory.

Alternatively, the inventive method may be carried out using dedicated hardware, typically a digital electronic, preferably integrated circuit, either specific (ASIC) or based on programmable logic (e.g. a Field Programmable Gate Array, FPGA).

Figure 4:
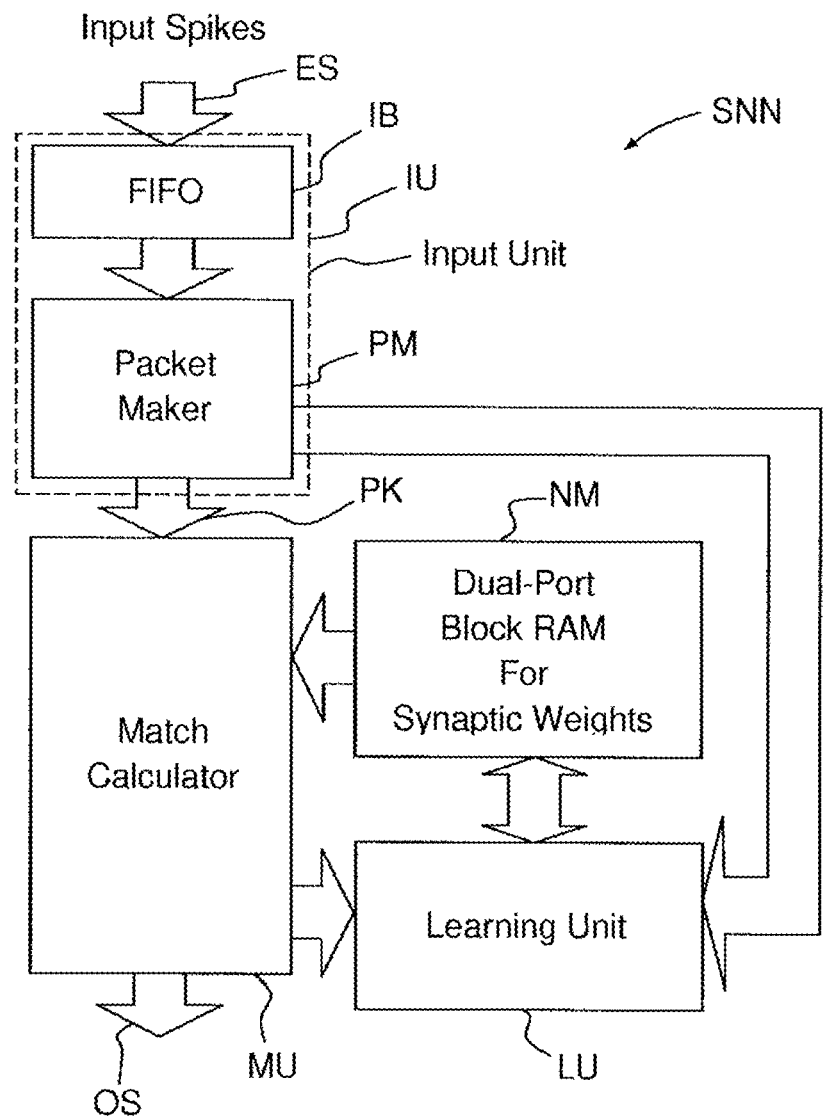
FIG. 4, a high-level block diagram of a digital electronic circuit according to an embodiment of the invention.

FIG. 4 shows a general block diagram of a digital electronic circuit SNN according to an embodiment of the invention. The circuit may e.g. be implemented as a FPGA and comprises four main functional blocks:

An input unit IU which receives event-representing signals ES from an input port of the circuit and generates data packets PK representing a number N of events. The figure shows that the input unit comprises two sub-blocks, a FIFO (first-in first-out) buffer IB and a "packet maker" PM whose structure will be described in detail with reference to FIG. 5.

A random-access (RAM) memory NM storing data describing the neurons. In the exemplary embodiment, each neuron is defined by several items of information: a vector of binary weights BWV, a value for the learning threshold TL and a value for nswap which controls learning speed. Memory NM is preferably a dual-port block RAM belonging to the FPGA. In the following it will be assumed that the memory NM contains M memory words, identified by log 2(M)-bit addresses, each word storing the items of information defining a neuron. Moreover, it will be assumed that each neuron has a M-bit binary weight vector. This is not essential, but it simplifies the implementation and, as discussed above and explained in detail with reference to FIG. 8, eases multi-layer processing.

A matching unit, or match calculator MU which receives at its input data packets coming from the input unit and vectors of binary weights read from the memory, and uses them for computing neuron potentials and generating output signals (or "output spikes") OS, identifying neurons which have fired. Advantageously, the matching unit also modifies the learning threshold of neurons, and writes it into the appropriate location of the memory NM. The matching unit will be described in detail with reference to FIG. 6.

A learning unit LU which implements the learning algorithm. This unit receives "learning events" from the matching unit, data packets from the input unit and binary weights from the memory, and uses these elements for computing updated data describing the neurons, which are written into the memory. The learning unit will be described in detail with reference to FIGS. 7A, 7B and 7C.

The subdivision of the circuit in functional blocks may or may not correspond to a physical reality. For instance, in a FPGA or ASIC implementation, logic blocks belonging to a same functional block may or may not be adjacent to each other. In a multi-chip implementation, it is not necessary that all the elements of a same functional block are realized on the same chip, or that all the logical blocks of the same chip belong to a same functional block. This is to say that the boundaries between functional blocks are largely conventional.

For reasons that will be understood later, in the exemplary embodiment event-representing signals ES consist of two fields: an "address" field EA, which identifies the event type, and a "population" field NPN. For instance, a 16-bit signal ES may comprise a 10-bit event field, allowing the identification of 1024 different event types, and a 6-bit population field.

As mentioned above, the input unit comprises a FIFO buffer IB and a packet maker PM. The FIFO buffer is a conventional device and does not warrant a detailed description. It is necessary in most implementations because event-representing signals ES arrive asynchronously; without a buffer, a new signal may arrive before the packet maker has finished processing the previous one, and be lost.

Figure 5:
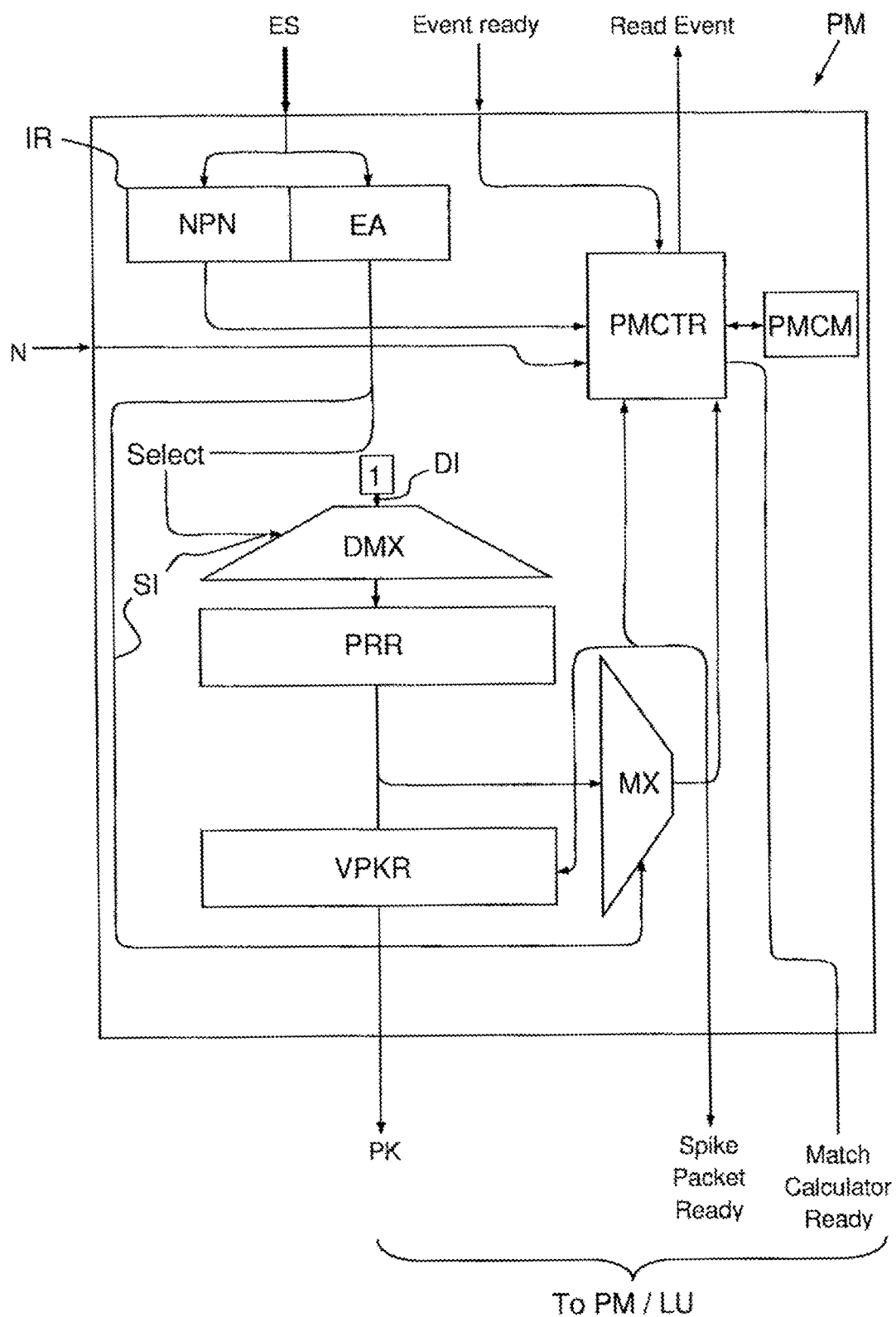
FIG. 5, a detailed block diagram of an input unit of the digital electronic circuit of FIG. 4.

A block diagram of the packet maker is illustrated on FIG. 5. Clock, enable and set/reset signals, as well as power supplies, are omitted for the sake of simplicity.

Event-representing signals received from the FIFO buffer are temporarily stored in an input register IR.

A controller PMCTR, which may be modeled by a finite state machine, may read from register IR the population number NPN to perform a "filtering": only signals having particular values of the NPN fields are processed. The usefulness of this filtering operation will be explained later, with reference to FIG. 8. The address field EA is provided to the select input S1 of an M-output demultiplexer DMX, having a constant value of "1" applied to its data input 01. Each possible value of the address field EA, i.e. each possible signal type, uniquely identifies an output of the demultiplexer, and a logical "1" is transferred to said output to be stored in a corresponding memory element of an M-bit register PRR. Before receiving the first signal, all the memory elements of said register had been initialized to "0".

If all the received signals were different from each other, after receiving N signals the register PRR would contain exactly N "1" identifying said signals, and (M-N) "0". It would therefore correspond to what has been called, in the preceding description of the unsupervised detection method, an "input packet". However, in practice, there is a possibility that two or more incoming signals are of a same type; such signals only contribute to a single "1" in the packet—otherwise stated, duplicate signals have to be discarded in order to ensure that each packet contains exactly N "ones".

For this purpose, the address field of each incoming signal is also provided to the select input S1 of an M-input multiplexer MX, whose output is connected to the controller PMCTR. This allows the controller to "read" a memory element just before a "1" is written into it. If the element contains a "0", a counter PMCM is incremented; if it already contains a "1", the incoming signal is considered a duplicate to be ignored, and the counter is not incremented. When the counter attains the value of "N" (the packet size, provided e.g., by an external signal), the register PRR contains a fully formed" packet PK, which is transferred to another register, VPKR, in order to be provided to the packet maker output (in practice, this means that the matching unit receives a signal informing it that it can read the packet at the output of the packet maker, said output being directly connected to the register VPKR). Unlike PRR, whose content changes at each reception of an event-representing signal, VPKR always contains a "fully formed" signal, and its content only changes upon the completion of the next packet. This is why VPKR, and not PRR, is directly connected to the output of the packet maker.

The controller exchanges different signals with other blocks of the circuit: it receives a "Event_ready" signal from the FIFO buffer, indicating that the buffer is not full, and sends to it a "Read Event" prompting the transmission of the first available signal to the input register IR; it sends a "Spike Packet Ready" signal to the match calculator unit MU and receives from it a "Match Calculator Ready"; the "Spike Packet Ready" signal also triggers the transfer of the packet PK from the register PRR to VPKR. And, depending on the received signals, it controls the operation of the other logical blocks (demultiplexer, multiplexer, counter, register).

Figure 6:
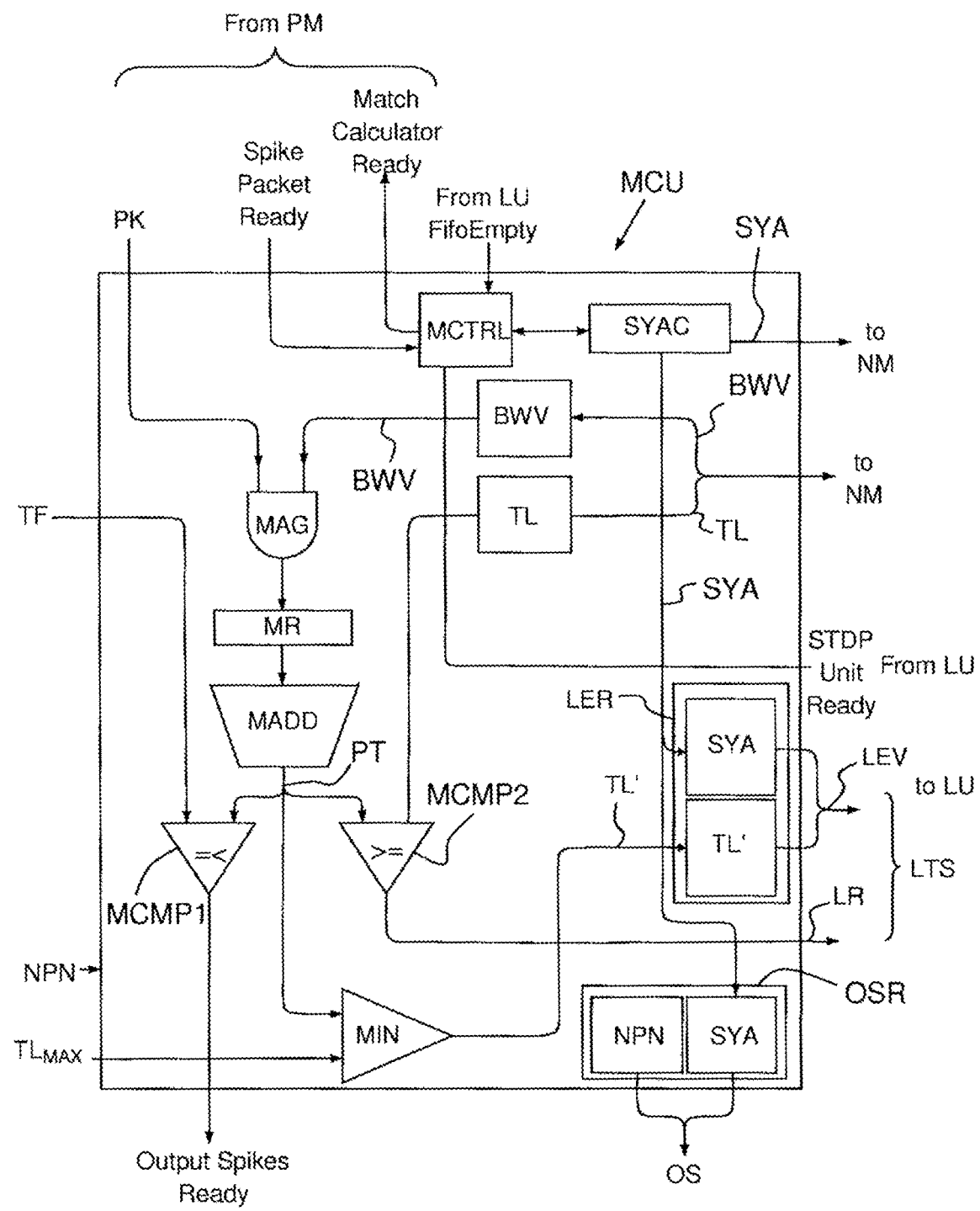
FIG. 6, a detailed block diagram of a match calculating unit of the digital electronic circuit of FIG. 4.

FIG. 6 is a block diagram of the matching unit MU.

Like the packet maker (and, as it will be discussed later, the learning unit), the matching unit comprises a controller MCTRL—which, again, may be modeled by a finite state machine—controlling the operation of the logical blocks of the unit and exchanging signals with the controllers of other units. As discussed above, it exchanges "Spike Packet Ready" and "Match Calculator Ready" signals with the input unit in order to acquire packets PK from it. It also receives a "STDP Unit Ready" signal informing it when the learning unit is ready to update neurons.

The main task of the packet maker is to calculate the matching between a packet PK and the binary weight vectors BWV of all the neurons—or at least of a predetermined subset thereof. To do so, the controller MCTRL increments a counter SYAC, whose content successively takes values corresponding to all the memory (or "synaptic") addresses SYA of the binary weight vector of the different neurons. The content of the counter is used to perform a reading access to the memory, allowing the matching unit to read the binary weight vector BWV and the learning threshold TL of the corresponding neuron, which are stored in respective registers. The current SYA address is also stored in a field of an output register OSR, connected to an output port of the circuit. Another field of the output register stores the population number NPN, which may be provided from a signal coming from outside the circuit, or be a constant value (e.g. if the filter implemented by the input unit controller ensures that only signals having a same population number are processed; in this case, the value of NPN stored in the output register OSR may be different from that of the processed signals; again, this issue will be discussed later with reference to FIG. 8). Moreover, the synaptic address SYA is also stored in a field of another register, called the "learning event register" LER, to which the learning unit has access.

The packet PK coming from the packet maker and the binary weight vector BWV read from the memory—both M-bit binary words—undergo a bit-wise logical AND operation, carried out by a bank of AND gates MAG operating in parallel. The outputs of these logical gates are stored in an M-bit register MR, called the matching register. It will easily be understood that a memory element of the matching register only contains a "1" if both the packet PK and the weight vector contains a "1" at the corresponding position, i.e. if they match. An adder MADD (e.g. a three-stage pipelined adder) computes the sum of all the bits of the matching register; the result is the potential value PT of the current neuron for the processed packet.

The potential PT is provided at the input of three logical blocks:

A first digital comparator MCMP1 compares it with the firing threshold TF, provided by an external signal. If PT is greater or equal than TF, an "Output Spike Ready" flag is raised at an output of the circuit, to notify that an output signal OS may be read from the output register OSR. The output signal OS consists in the address of the firing neuron, SYA, and optionally of a population number NPN.

A logic block MIN receives the potential PT on a first input and an externally provided value TLmax, representing a maximal allowed value for the learning threshold, on a second output. The lowest of the values present at the inputs is transmitted to the output of the logic block, to be stored in a field TL' of the learning event register LER. TL' represents an updated value of the learning threshold—see equation (1) above. Alternatively, the potential PT could be stored in the learning event register LER to be transmitted to the learning unit, and the logic block MIN could belong to said learning unit.

A second digital comparator MCMP2 compares the potential PT to the learning threshold TL, read from the memory. If PT is greater or equal than TL, a "Learning Event Ready" (LR) flag is raised to notify to the learning unit that it can read a "learning event" LEV from the learning event register LER, containing the address SYA of the neuron whose binary weight vector has to be updated from the learning unit and the updated learning threshold TL'.

Digital comparators are well known digital elements. Logic block MIN can be obtained by combining a digital comparator and a multiplexer.

Figure 7A:
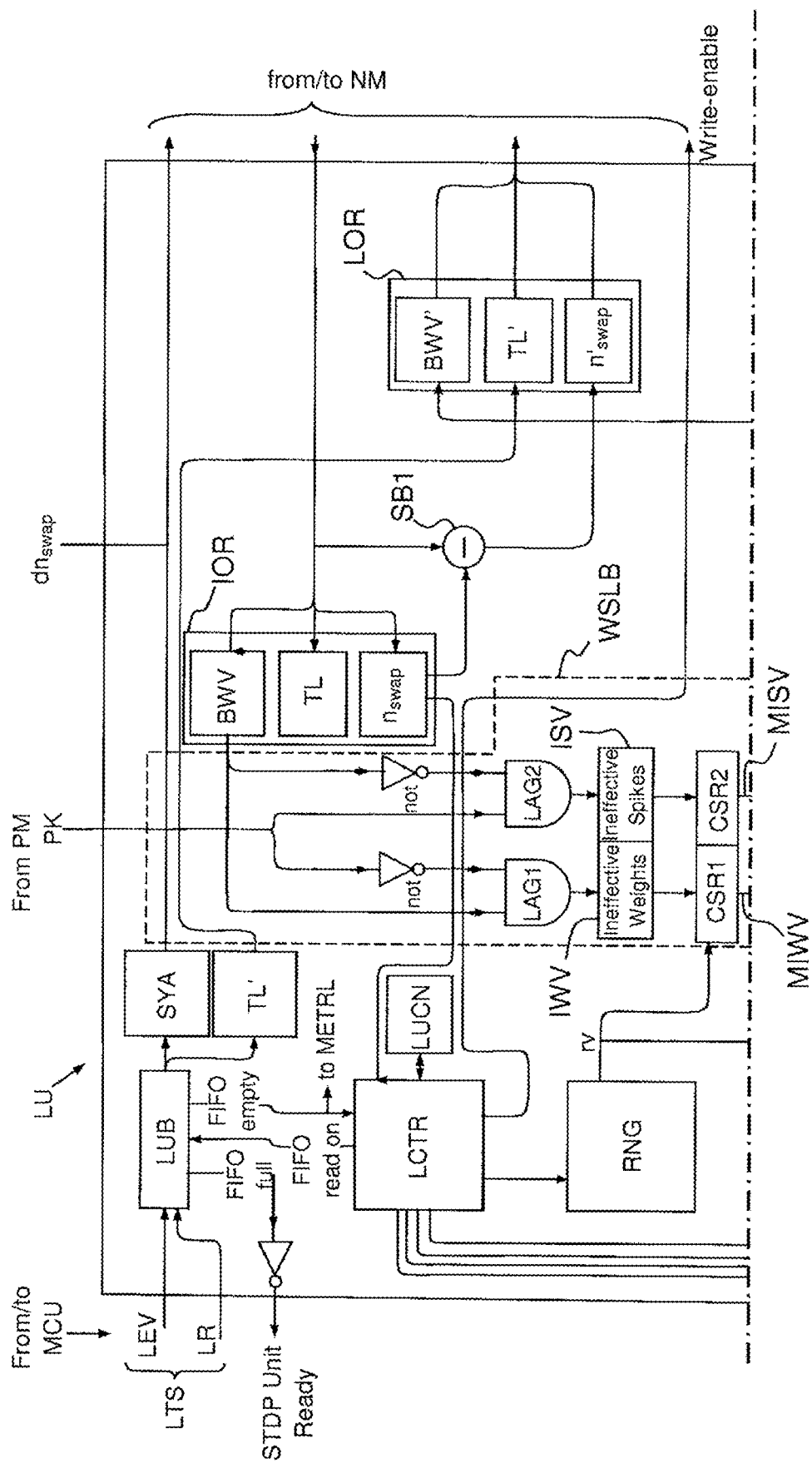
FIGS. 7A and 7B, a detailed block diagram of a learning unit of the digital electronic circuit of FIG. 4.
Figure 7B:
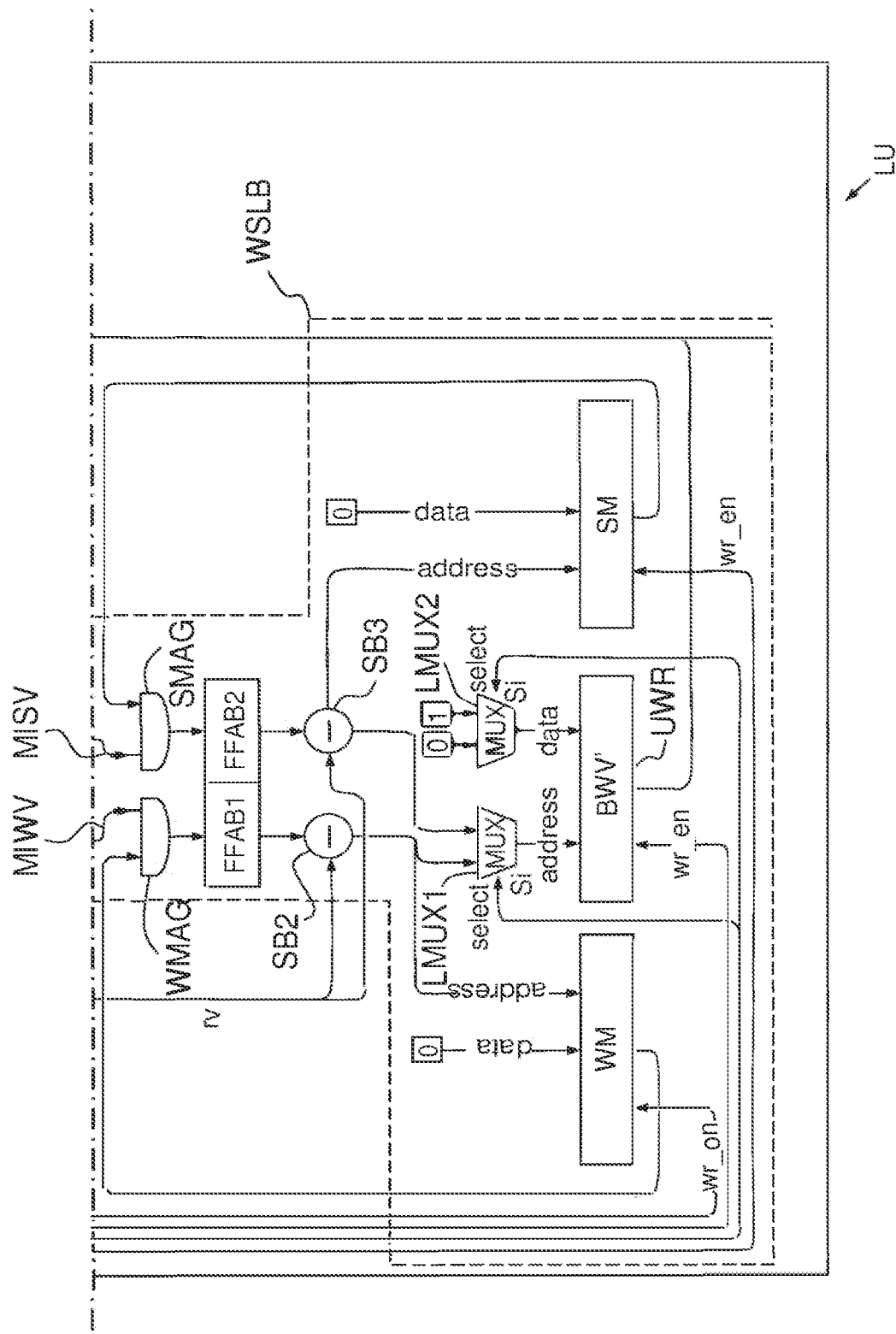

FIGS. 7A and 7B form a block diagram of the learning unit LU.

The learning unit receives a learning triggering signal LTS, comprising the learning event LEV and the LR flag, from the matching unit. More precisely, the LR signal triggers the storing of LEV in a FIFO buffer LUB. When it is full, and therefore unable to acquire further LTS signals, the buffer generates a "FIFO full" signal—whose complement constitutes the "STDP Unit Ready" transmitted to the controller MCTRL of the matching unit; when "STDP Unit Ready" goes to zero, the matching unit stops its operation, and when "STDP Unit Ready" goes again to one it resumes it. When empty, the buffer also generates a "FIFO empty" signal, which is transmitted to a controller LCTR of the learning unit; the "FIFO empty" signal is also transmitted to the controller MCTRL of the matching unit, which triggers the "Match Calculator Ready" flag when it is informed that the learning unit has finished its job. The controller can be modeled as a Finite State Machine, and supervises the operation of the logical blocks of the learning unit. In particular, it generates a "FIFO Read_en" signal triggering the extraction of the first available data element from the buffer LUB.

The data element extracted from the buffer is a learning event LEV, which comprises a synaptic address SYA, i.e. the address of a neuron within the memory NM, and the updated learning threshold of the same neuron, TL'. The synaptic address is transmitted to the address port of the memory, while TL' is temporarily stored in a corresponding field of an output register LOR.

Transmitting the synaptic address SYA to the memory NM triggers a reading operation of the data items, stored at said address, defining a neuron which has crossed the learning threshold. These data items are the binary weight vector BWV, the learning threshold TL itself and the swap number $n_{swap}$. They are temporarily stored in an input register IOR. The learning threshold is not processed by the learning unit, so its storage could also be omitted. Instead, the learning unit changes the values of the binary weight vector BWV and, preferably, of the swap number $n_{swap}$: this is the aim of the learning process. The updated values of the binary weight vector, BWV', and of the swap number, $n_{swap}$, are stored in respective fields of the output register LOR, together with TL' (see above). Upon reception, from the memory, of a "Write_enable" signal generated by the controller LCTR, the content of the output register is written into the memory location of address SYA, thus completing the learning process.

Updating $n_{swap}$ simply consists in subtracting the decrement $dn_{swap}$ from it, which is performed by a conventional subtracting block, SB1.

Updating the binary weight vector, on the contrary, is the most complex operation performed by the whole circuit. As explained above, it consists in swapping $n_{swap}$ "ones" and "zeros" within the vector. To ensure that the exact number of bits is swapped, the current (i.e. not updated) value of $n_{swap}$, read from the IOR register, is transmitted to the controller LCTR, which stores the value of $n_{swap}$ into counter LUCN. The counter is decremented after each swapping operation; the learning process ends when its content reaches zero, and this triggers the generation of the "Write_enable" signal from the controller (see above).

The bit swapping block WSLB, which constitutes the bulk of the learning unit, receives at its inputs the data packet PK, generated from the packet maker PM, and the current binary weight vector BWV from the IOR register.

The binary weight vector BWV and the complemented (i.e. passed through a bank of M "NOT" gates) data packet PK undergo a bit-wise logical AND operation, carried out by a bank of AND gates LAG1 operating in parallel. The result, which is called the "ineffective weights vector" IWV, is stored in a register. The IWV vector contains a "1" at each position corresponding to a "1" in the weight vector and a "0" in the data packet; otherwise stated, IWV represents active weights associated with missing events.

The complemented (i.e. passed through a bank of M "NOT" gates) binary weight vector BWV and the data packet PK undergo a bit-wise logical AND operation, carried out by another bank of AND gates LAG2 operating in parallel. The result, which is called the "ineffective spikes vector" ISV, is stored in a register. The ISV vector contains a "1" at each position corresponding to a "0" in the weight vector and a "1" in the data packet; otherwise stated, ISV represents events of the packet corresponding to inactive weights.

The IWV and ISV vectors are transferred to respective circular shift registers CSR1, CSR2, and undergo a circular shift by a same (pseudo)random amount rv, determined by a random number generator RNG, controlled by the controller LCTR and having an output connected to a shift input port of each circular shift register. Several implementations of random generators are known in the art of digital electronics. According to a particular embodiment, RNG is a simple counter always counting up in each clock cycle. Because the exact time of processing each learning event LEV depends on several parameters, the value of this counter at a given time can be considered random for the purposes of the learning algorithm. Such an embodiment is advantageous because it requires particularly few hardware resources.

The circularly-shifted vectors IWV and ISV then undergo a bit-wise logical AND operation with respective mask vectors WM, SM, stored by registers. Before the first swapping, all the bits of the mask vectors are set at a logical "1", therefore IWV and ISV are unchanged by the bit-wise AND operation. References WMAG, SMAG designate the banks of logical AND gates performing the operation.

The binary vectors at the outputs of the AND gates are passed through respective logical blocks FFAB1, FFAB2 which find the first active bit of each of them. Otherwise stated, FFAB1 outputs a value which represents the position of the first logical "1" in the MIVW=ISW AND WM vector; FFAB2 does the same thing for ISV (MISV=ISW AND SM).

Figure 7C:
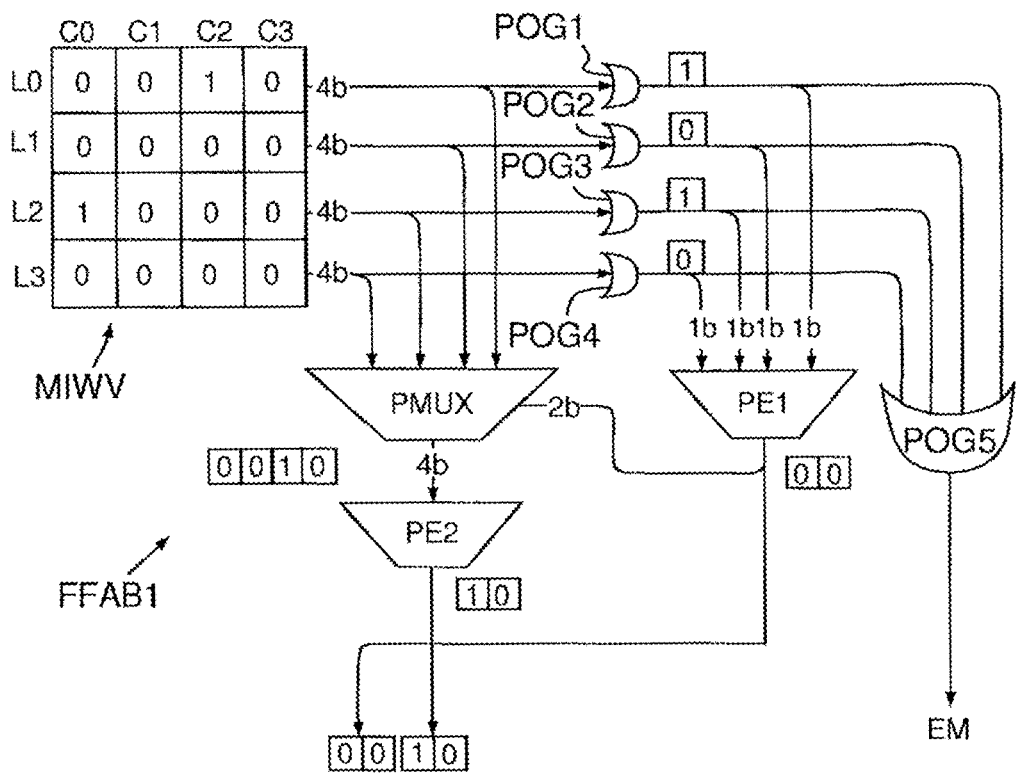
FIG. 7C, a block diagram of a logical unit of FIG. 7B.

A possible implementation of the FFAB1 block is illustrated on FIG. 7C; that of FFAB2 may be identical. In the embodiment of FIGS. 7A/7B, MIWV is a 1024-bit binary word; however FIG. 7C uses a 16-bit word for the sake of simplicity. More precisely, the value of IWV is taken to be "001000001 0000000". This 16-bit word is used to fill a 4×4 two-dimensional array, whose lines are L0: "0010"; L1: "0000"; L2: "1000" and L3: "0000". Conversely, the columns are C0: "0010"; C1: "0000"; C2: "1000" and C3: "0000". The first active bit is the third one, i.e. the bit belonging to line L0 and columns C2. Four four-input OR gates POG1-POG4 are used for OR-ing the bits of the four columns. The output of a logical gate is a bit taking the value "1" if the corresponding line contains at least one "1", representing an ineffective weight, and "0" otherwise. In the example, the bits corresponding to lines L0 and L2 are set to "1", those of lines L1 and L3 to "0". A first priority encoder PE1 receives at its inputs the outputs of these logical gates (1-0 1-0). The inputs have different priorities: the one corresponding to line L0 has the highest priority, followed by L1, then L2 and finally L3. The output of the priority encoder is a 2-bit word identifying the highest-priority input having a "1" value; in this case, this output is "00", identifying line L0. This output is provided at the "select" input S1 of a multiplexer PMUX, whose four inputs are connected to respective lines of the columns. Therefore, the four bits of the selected line L0 are present on the output of the multiplexer, to be provided as inputs to a second priority encoder PE2, whose output is another 2-bit word identifying the position of the first "1" of the line—in this case "10", corresponding to the third position. A 4-bit number is then formed by juxtaposing the outputs of the first and second priority encoders, in this order. The value of this number ("0010", i.e. 2) corresponds to the position of the first "1" within the IWV vector—i.e. the third position.

The random number rv, which determines the amount of the circular shift, is then subtracted from the output of logical blocks FFAB1, FFAB2 using subtracting blocks SB2, SB3. It is important to note that these are "circular" subtractions: for instance, if the output of FFAB1, that of FFAB2 and rv are 10-bit binary words, a negative result of the subtraction will be represented by a positive number 210-|r|−1; therefore, the result will always be between 0 and $2^{10}-1=1023$.

It will be easily understood that the results of the subtractions represent the $rv^{th}$ active bits of the IWV and of the ISV vectors. Otherwise stated, the subtractions readjust the positions found by logical blocks FFAB1, FFAB2, compensating the circular shift.

It has been implicitly assumed that a positive value of rv corresponds to a shift to the right of the bits of ISW and ISV. If it corresponded to a shift to the left, the subtracting blocks SB2, SB3 should simply be replaced by adders.

A first multiplexer LMUX1 has two data inputs connected to the outputs of the subtracting blocks SB2, SB3, a select input Si connected to the controller LCTR and an output connected to an address input of a register UWR, whose content has been initialized to the current value of the weight vector BWV. A second multiplexer LMUX2 has two data inputs receiving constant binary values: "1" and "0", a select input Si connected to the controller LCTR and an output connected to a data input of register UWR. The register also has a "write_enable" input receiving a signal (reference wr_en) generated by the controller. It will be understood that, with suitable control signals from the controller, the multiplexer can be used to write a "0" at the position of the $rv^{th}$ ineffective weight of the binary weight vector, and a "1" at the position of the $rv^{th}$ ineffective spike. This is the first of the required swapping operations, improving the match between the weight vector and the data packet.

The output of SB2 is also applied to an address input of the register storing the WM mask, said register having a constant "0" applied at its data input. Similarly, the output of SB3 is also applied to an address input of the register storing the SM mask, said register having a constant "0" applied at its data input. As a consequence, a "0" is put in each of the masks at the position of a swapped bit.

The updated masks are then bit-wise AND-ed with the circularly shifted IWV and ISV vectors, the results being applied at the input of logical blocks FFAB1, FFAB2. Due to the bit-wise AND operations with the updated mask, the first active bits of IWV and ISV are now put to zero; therefore FFAB1 and FFAB2 find the second active bits of the original IWV/ISV vectors, and so on.

These operations are repeated $n_{swap}$ times (the contoller decreases the content of counter LUCN by one at each iteration, and stops when a value of 0 is reached; it also stops when BWV' perfectly matches the input packet, i.e. when there are no more ineffective weights and spikes, and therefore the MIWV and MISV vectors only contain zeros), thus resulting in the flipping of a same number of "ineffective weight" and "ineffective spike" bits or, equivalently, in their swapping. This condition is checked by "OR-ing" the outputs of logical gates POG1-POG4 using an additional four-input OR gate POG5 (see FIG. 7C). Gate POG5 generates a one-bit signal EM which is transmitted to the controller LCTR (not represented on FIGS. 7A/7B for the sake of simplicity).

The updated binary weight vector BWV', contained in the UWR register, is then transmitted to the corresponding field of the output vector LOR, before being written into the memory, as already explained.

The circuit described above (FIGS. 4-7C) has been implemented using a XC6SLX150T-3 Spartan-6 ® FPGA by Xilinx®. Synthesis was performed using Verilog language and a XST synthesizer, also by Xilinx. The circuit comprised 1024 neurons and 1024 synapses (i.e. M=1024); the number N of spikes in a packet was taken equal to 64 and the number W of weights in a neuron was 32. The initial value of the learning threshold was taken to be 7, and its final value ($TL_{MAX}$) was 12; the firing threshold was also equal to 12. The initial value of $n_{swap}$ was 32, with a decrement $dn_{swap}$ of 8 down to 0 (or, in some other embodiment, to a nonzero minimal value, e.g. 1). Advantageously, all these parameters are programmable in the FPGA through a JTAG port.

A set of 64 "conventional" supervised STDP neurons was added to classify the detected pattern. A supervised STDP neuron has an extra external input (called "supervisor"), encoded also through AER (Address Event Representation), which forces post-synaptic spikes from this neuron when its representative "category" (or feature) is present at the input. Therefore, whenever a "supervisor" spike arrives, the corresponding active synapses will be potentiated. Otherwise active synapses will be depressed. Suitable STDP neurons are described e.g., in the paper by Masquelier T, Guyonneau R, and Thorpe SJ "Spike Timing Dependent Plasticity Finds the Start of Repeating Patterns in Continuous Spike Trains" PLoS ONE 3(1): e1377 (2008).

The implementation used 25% of the slices and 21% of the block RAMs of the FPGA; interface circuits and supervised neurons consumed an additional 19% of the slices and 25% of the block RAMs. The circuit was operated at a clock frequency of 100 MHz. The learning unit was able to accept about one packet every 10.24 μs, i.e. every 1024 clock cycles. Each packet contained 64 events (spikes); therefore the theoretical event acceptance rate of the circuit was about 6 Meps (million events per second); in practice, an acceptance rate of 5.3 Meps was actually achieved. By way of comparison, a software simulation running on one core of an Intel® Core™ i5 CPU could not exceed 10 keps (thousand events per second).

Power consumption at maximum speed rate was 530 mW: 143 mW of static consumption and 387 mW of dynamic consumption, corresponding to 73 nJ for each input spike. It has been estimated that a standard-cell ASIC implementation, based for instance on Toshiba's FFSA™ technology, would reduce consumption by 70% while improving speed by a factor of 5.

The circuit has been tested using event-representing signals generated by a simulator. Repeating patterns were generated, including at least one event among 32 different event types; signals representing 992 other event types were generated randomly. It was found that 6 presentations were sufficient to ensure reliable detection of the patterns. The detection algorithm turned out to be quite insensitive to spike loss: the rate of successful detection was only reduced by 2% (from 100% to 98%) if 40% of the spikes were deleted; the rate was still 88% with a 50% deletion rate. It also proved reasonably insensitive to jitter: at an input spike rate of 20.48 keps (average time to make a packet: about 3.2 ms) a jitter of up to 2 ms only reduced the detection rate by 4% (from 100% to 96%).

Figure 8:
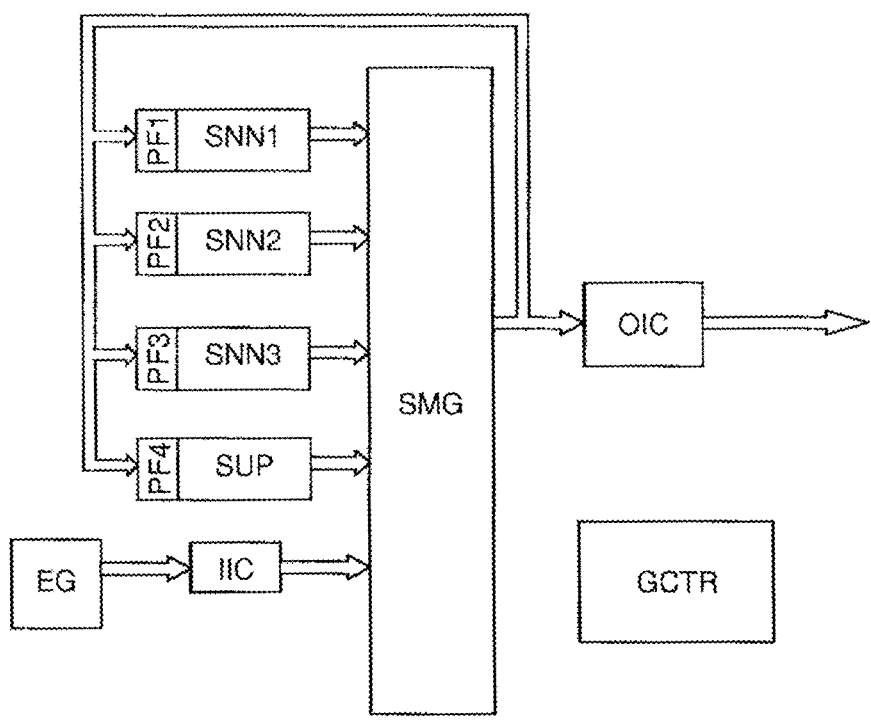
FIG. 8, a high-level block diagram of a digital system comprising several instances of the circuit of FIG. 4.

FIG. 8 illustrates a diagram of a digital system comprising a plurality of digital electronic circuits of the type described above—in the exemplary embodiment of the figure there are three such circuits: SNN1, SNN2 and SNN3. Each of these circuits implements a population filter: PF1, PF2, PF3, only allowing in event-representing signals characterized by a particular population number. On the figure, the filters are represented as separate logic blocks but, as explained above, they may be implemented by the input unit controllers. In particular, the filters PF1 and PF2 of circuits SNN1 and SNN2 only allow in signals with population number NPN=1, and filter PF3 of circuit SNN3 only allows in signals with population number NPN=2.

Optionally an additional circuit SUP implementing a different, supervised, artificial neural network (of any known type) may also be present. This circuit implements a population filter PF4 which only allows in signals with population number NPN=3.

The output ports of circuits SNN1, SNN2, SNN3 and SUP are connected to respective input ports of a digital signal merger SMG, having a single output which is connected to the inputs of the circuits, thus implementing a data loop. An event generator EG (for instance, a dynamic vision sensor, or DVS) is also connected to a respective input of the merger through an input interface circuit IIC (for instance, an Address-Event-Representation —AER—interface). An output interface circuit OIC (for instance, another AER interface) is connected to the output of the merger. The merger SMG provides arbitration to manage the collisions between output signals of circuits "firing" almost simultaneously. The output interface circuit has a population filter allowing in signals with population number NPN=4.

The input interface generates event-representing signals ES with a population number of 1; therefore, they are processed by circuits SNN1 and SNN2. These circuits have a matching unit configured to generate output signals having a population number of 2; this way, these output signals constitute events suitable to be processed by circuit SNN3. In turn, this circuit produces output signals with population number of 3, suitable to be processed by the supervised artificial neural network SUP. The output signals of this latter circuit have a population number of 4, in order to be accepted by the output interface. Overall, the system implements a multi-layer neural network wherein circuits SNN1 and SNN2 implement a first layer, circuit SNN3 a second layer and SUP a third layer. The first and second layer perform unsupervised detection of recurring patterns, while the third (supervised) layer associates each detected pattern with a predetermined class.

Two separate circuits are advantageously used to implement the first layer to assist in the detection of patterns which are split between two successive packets. For this purpose, circuit SNN2 ignores the first N/2 events with population number NPN=1; this ensures that the first packet generated by its input unit comprises the last N/2 events of the first packet of the circuit SNN1 and the first N/2 events of its second pattern, and so on. This way, if a pattern happens to be split between two successive packets of one circuit (a situation which might result in a missed detection), it will fall right in the middle of a packet of the other circuit. Due to duplicate events, after a while the synchronization between circuits SNN1 and SNN2 risks being lost and a reset is necessary. The same approach may be used for other layers.

A general controller GCTR supervises the operation of the system. For instance, it may set the values of different parameters of the circuits of the systems (e.g. TL, $T_F$, $n_{swap}$, N, the population numbers of the filters . . . ; in FIGS. 5-8, all these parameters are represented by signals coming from outside the units), perform different tests.

The system of FIG. 8 may be implemented in a single FPGA (or another kind of programmable device), or ASIC, or in the form of a multi-chip system.

The invention has been described with reference to a specific embodiment, but it is not limited to it.

For instance, the implementation of one or more logic blocks may be changed without changing that of the other blocks—except, if necessary, for ensuring the compatibility of the data formats. The disclosed implementations, however, are believed to realize an optimal trade-off amongst complexity, speed and power consumption.

In particular, in the swapping block WSLB of the learning unit, $n_{swap}$ random numbers could be generated successively in order to swap non-successive ineffective weight and ineffective spike bits. This implementation, however, would be much slower.

The data representations may also be changed to a certain extent. For instance, in the exemplary embodiment; the binary weight vector of each neuron is represented by a single M-bit binary word. In an alternative representation, it could be represented by W binary words of $\log_2 M$ bits, each representing the address of a bit set to 1. If M=1024 and W=32, this representation requires 320 bits per neuron, instead of 1024, resulting in considerable savings in memory space. This implementation, however, is less flexible and a conversion to the "explicit" M-bit representation is required in order to be able to perform the bitwise AND operation in the matching unit and in the learning unit.

The number W of weights is not necessarily the same for all the neurons; similarly, thresholds TL and TF may be different from one neuron to another. If neurons use different values for TF, the matching unit will have to be slightly modified in order to include an additional register storing the TF value for the currently processed neuron.

Emphasis has been put on FPGA implementations, but this is not limiting. Any other hardware implementation, including multi-chip boards, ASIC and semi-custom IC's fall within the scope of the invention.

The invention claimed is:

1. A method of performing unsupervised detection of repeating patterns, the method comprising:
receiving, via an input port of a digital electronic circuit, a first series of digital packets representing respective events, the digital electronic circuit including a memory configured to store data defining a first layer having a plurality of neurons, wherein each of the plurality of neurons is associated with a set of binary weights, said set of binary weights forming a neuron weight vector for the respective neuron of the plurality of neurons; and
performing a learning function that comprises modifying, by a processing circuit, the set of binary weights associated with the respective neuron having a potential value exceeding a learning threshold value, the modifying comprising:
processing an input packet from the received first series of digital packets;
selecting, based on the processing of the input packet:
one or more active weights of a neuron weight vector that do not coincide with active events of the input packet, and
one or more inactive weights of the neuron weight vector that coincide with active events of the input packet; and
swapping the selected one or more active weights of the neuron weight vector that do not coincide with the active events of the input packet with the selected one or more inactive weights of the neuron weight vector that coincide with the active events of the input packet, the swapping maintaining constant a number of active weights in the neuron weight vector,
wherein, after the modifying, a greater number of active weights of the modified neuron weight vector coincide with active events of the input packet and a lesser number of inactive weights of the modified neuron weight vector coincide with active events of the input packet.

2. The method of claim 1, further comprising outputting, by the processing circuit, a second series of digital signals indicative of neurons in the plurality of neurons having a potential value exceeding a firing threshold value.

3. The method of claim 2, wherein the firing threshold value is a same value across the first layer.

4. The method of claim 3, wherein the memory is further configured to store data defining a second layer having a second plurality of neurons, and wherein each of the second plurality of neurons is associated with a second set of binary weights, the second plurality of neurons receiving input from an outputted second series of digital packets from the first layer.

5. The method of claim 4, wherein a packet length associated with the first layer differs from a packet length associated with the second layer.

6. The method of claim 1, wherein a number of binary weights in the set of binary weights is a same number for each of the plurality of neurons.

7. The method of claim 1, further comprising updating the learning threshold value during learning by the processing circuit.

8. The method of claim 1, further comprising updating a number of available binary weights during learning by the processing circuit.

9. The method of claim 1, further comprising:
computing, by the processing circuit, the potential value of each neuron by incrementing a counter after applying an AND function to binary values in the first series of digital packets and the binary weights to generate results.

10. A digital electronic circuit for unsupervised detection of repeating patterns the digital electronic circuit comprising:
an input port configured to receive a first series of digital packets representing respective events;
a memory configured to store data defining a first layer having a plurality of neurons, wherein each of the plurality of neurons is associated with a set of binary weights, said set of binary weights forming a neuron weight vector for the respective neuron of the plurality of neurons; and
a processing circuit configured to implement a learning function that comprises modifying the set of binary weights associated with the respective neuron having a potential value exceeding a learning threshold value, the modifying comprising:
processing an input packet from the received first series of digital packets;
processing an input packet from the received first series of digital packets;
selecting, based on the processing of the input packet:
one or more active weights of a neuron weight vector that do not coincide with active events of the input packet, and
one or more inactive weights of the neuron weight vector that coincide with active events of the input packet; and
swapping the selected one or more active weights of the neuron weight vector that do not coincide with the active events of the input packet with the selected one or more inactive weights of the neuron weight vector that coincide with the active events of the input packet, the swapping maintaining constant a number of active weights in the neuron weight vector,
wherein, after the modifying, a greater number of active weights of the modified neuron weight vector coincide with active events of the input packet and a lesser number of inactive weights of the modified neuron weight vector coincide with active events of the input packet.

11. The digital electronic circuit of claim 10, wherein the processing circuit is configured to output a second series of digital packets indicative of neurons in the plurality of neurons having a potential value exceeding a firing threshold value.

12. The digital electronic circuit of claim 11, wherein the firing threshold value is a same value across the first layer.

13. The digital electronic circuit of claim 11, wherein the memory is further configured to store data defining a second layer having a second plurality of neurons, and wherein each of the second plurality of neurons is associated with a second set of binary weights, the second plurality of neurons receiving input from the outputted second series of digital packets from the first layer.

14. The digital electronic circuit of claim 13, wherein a packet length associated with the first layer differs from a packet length associated with the second layer.

15. The digital electronic circuit of claim 10, wherein a number of binary weights in the set of binary weights is a same number for each of the plurality of neurons.

16. The digital electronic circuit of claim 10, wherein the learning threshold value is updated during learning by the processing circuit.

17. The digital electronic circuit of claim 10, wherein a number of available weights is updated during learning by the processing circuit.

18. The digital electronic circuit of claim 10, wherein the processing circuit is further configured to compute the potential value of each neuron by incrementing a counter after applying an AND function to binary values in the first series of digital packets and the binary weights to generate results.

19. The digital electronic circuit of claim 10, wherein the first series of digital packets are derived from a video stream or a set of images.

20. The digital electronic circuit of claim 10, wherein the input port comprises a population filter only allowing in event-representing signals characterized by a particular population number.

* * * * *